Aug. 27, 1940.  J. M. ROHRER  2,212,552
APPARATUS FOR MAKING SHOES
Filed Oct. 10, 1938   6 Sheets-Sheet 2
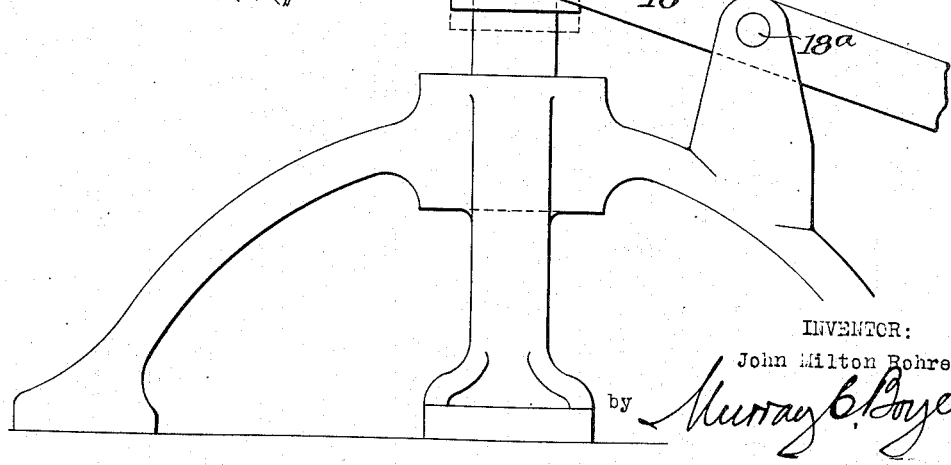
INVENTOR:
John Milton Rohrer,
by Murray C. Boyer
Atty.

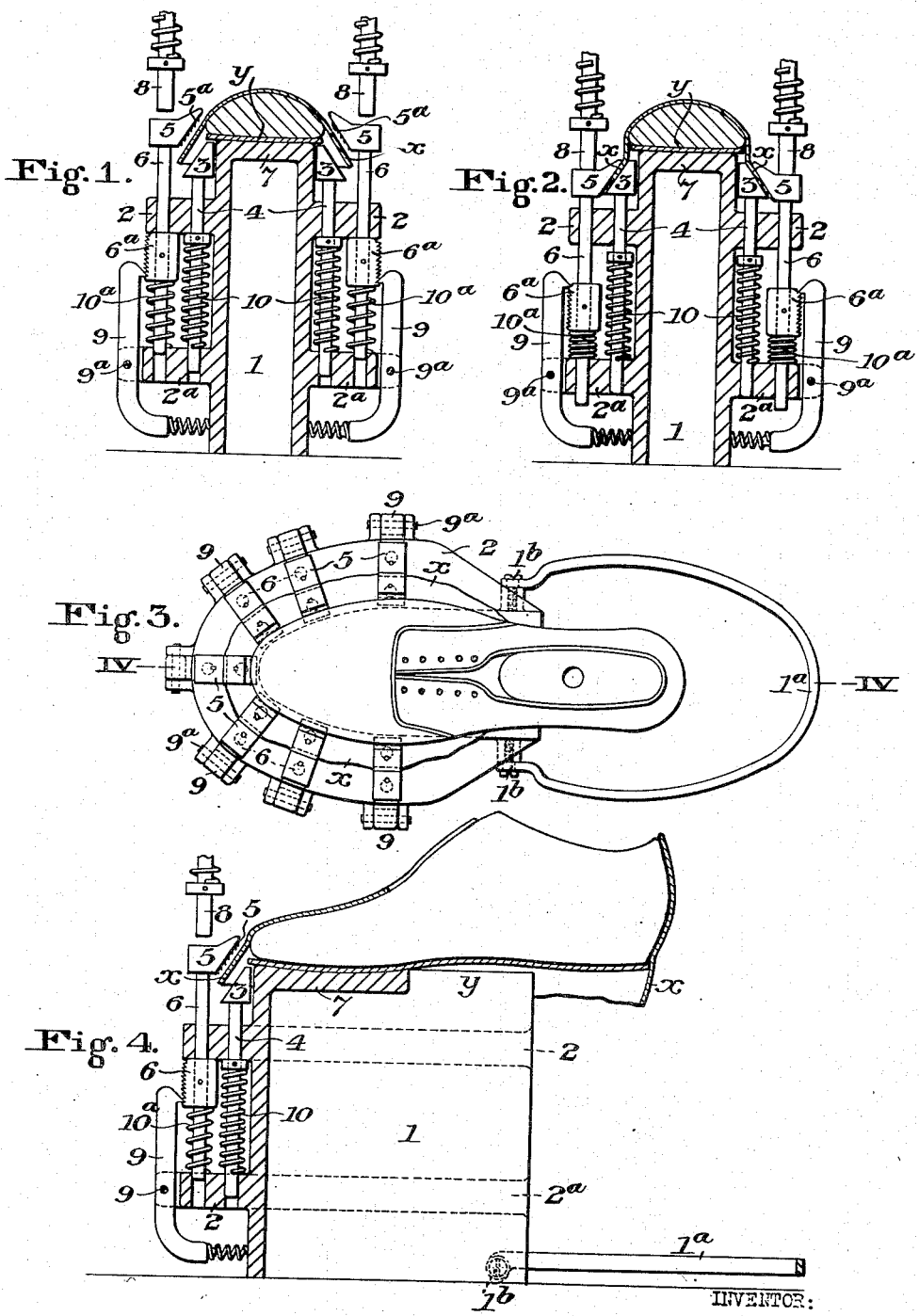

Aug. 27, 1940.   J. M. ROHRER   2,212,552
APPARATUS FOR MAKING SHOES
Filed Oct. 10, 1938   6 Sheets-Sheet 3

INVENTOR:
John Milton Rohrer,
by Murray C. Boyer
Atty.

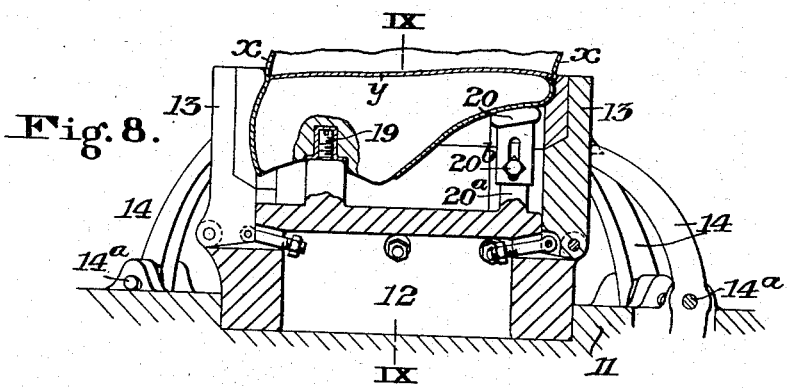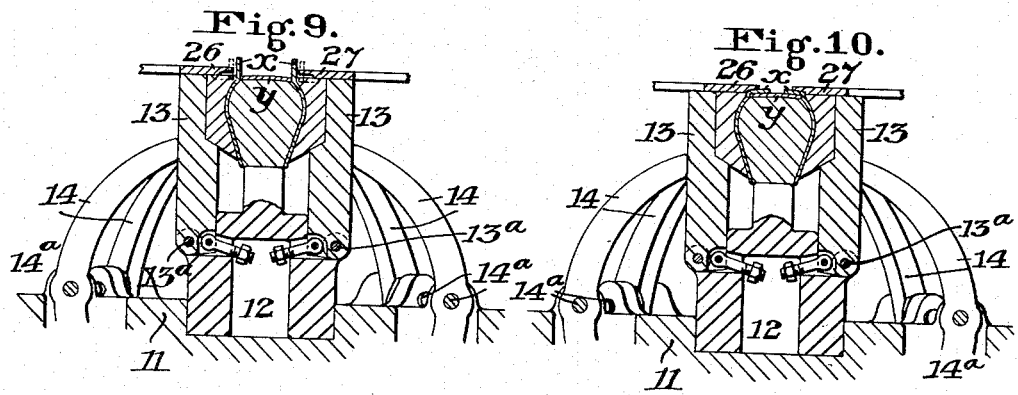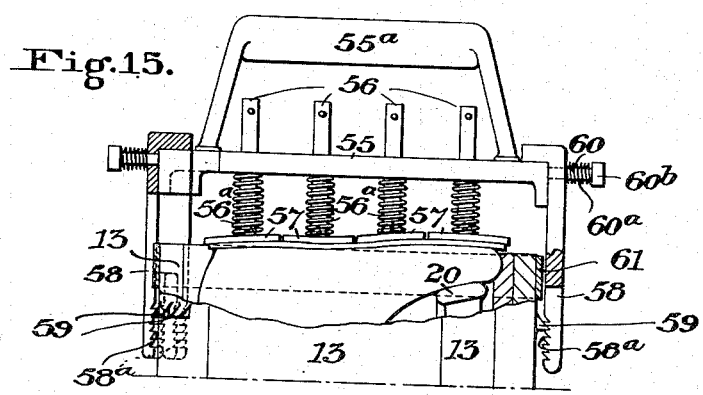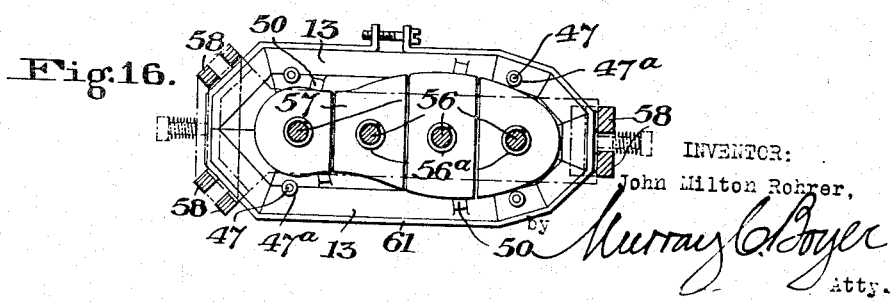

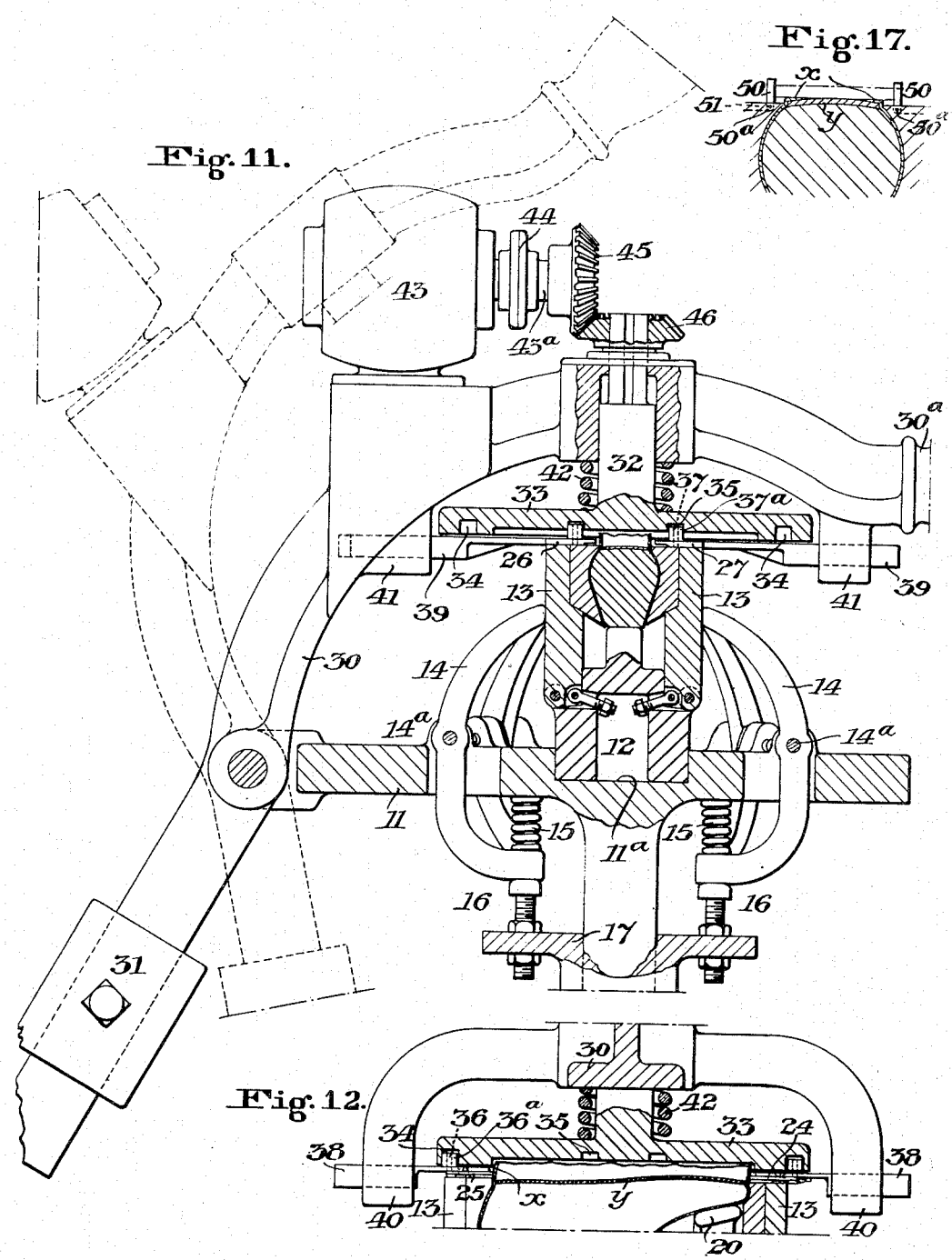

INVENTOR:
John Milton Rohrer,
by Murray C. Boyer
Atty.

Patented Aug. 27, 1940

2,212,552

UNITED STATES PATENT OFFICE 2,212,552

APPARATUS FOR MAKING SHOES

John Milton Rohrer, Orwigsburg, Pa.

Application October 10, 1938, Serial No. 234,318

21 Claims. (Cl. 12—7)

This application contains subject matter previously disclosed in application Serial No. 46,637 filed Oct. 24, 1935, which was a continuation of my application Serial No. 487,535 filed Oct. 9, 1930.

My invention relates to the manufacture of shoes, slippers, and similar articles of footwear, and comprises improved apparatus for effecting such work, whereby I am enabled to last a shoe without the application of tacks or other extraneous holding means passing through the upper into the last or carried by the latter.

In carrying out my invention, I provide means including a portable device for effecting the pulling-over operation; a sectional mold for receiving the last and upper from such pulling-over means; a support in which such mold is removably placed; means for closing the sectional mold around the last and upper and holding the latter in the pulled-over condition; means for retaining the mold in the closed condition; means for wiping the projecting portion of the upper, either over the initially placed insole carried by the last or outwardly, as the case may be, and means which may be detachably applied to the sectional mold for pressing or clamping the projecting portion of the upper after the same has been wiped or for pressing or clamping a sole applied to such wiped portion; the releasable securing means retaining the mold in its closed position so that it may be removed from its seat in the table or support provided with the mold-closing means which may also carry the wiper means and its operating mechanism.

A particular object of my invention is the provision of means in the form of a portable device for pulling over and holding an upper to a last; such device carrying gripping means engaging a projecting portion of the upper.

A further object of my invention is the provision of a sectional mold to receive the pulled-over upper so that when the latter is securely held by the gripping means of such device it may be transferred to the sectional mold for subsequent operations. As such pulling-over means is in the form of a portable device, it may be successively used for the pulling over of uppers upon successive lasts which are subsequently placed in sectional molds; being retained with the last and positioned upper until the latter are clamped by the mold sections.

A further object of my invention is the provision of a support or table for temporarily holding the sectional mold, with means for closing the sections of the latter so that it may grip the last and the pulled-over upper thereon; such sectional mold holding the upper and last in the relation produced by the pulling over operation, and the pulling over means being released after the mold sections have gripped the last and the positioned upper.

A further object of my invention is the provision of wiper means which may be mounted on the mold support or table, whereby the projecting portion of the upper may be flattened down into condition for the application of a sole, such wiping operation being effected inwardly and over an insole initially placed on the last, or outwardly, as may be desired.

A further object of my invention is the provision of means for clamping or holding down such wiped portion and/or a sole applied to the lasted upper after a suitable cementing medium has been applied and while the lasted upper is still retained in the sectional mold, such clamping or holding means being detachably applied to the sectional mold and the latter being held in the closed position so that it may be removed from its support or table and set aside until the projecting portion of the upper has been firmly fixed to the lasted upper, or until an applied sole has been retained; which sole may be subsequently stitched in place.

These and other features of my invention are more fully described hereinafter, reference being had to the accompanying drawings, more or less diagrammatic in character, in which:

Figure 1 is a cross-sectional view of a portable pulling-over device which I may employ in carrying out my invention, showing the last and upper positioned upon a table portion of the same and the gripping means in the open or inoperative position.

Fig. 2 is a similar sectional view showing the gripping means of the lasting device in the closed position; the upper having been pulled over the last and held in such position, such last and upper being ready for transfer to a sectional mold wherein it is clamped in the pulled-over condition.

Fig. 3 is a plan view of the portable pulling-over device shown in Figs. 1 and 2.

Fig. 4 is a sectional elevation of the pulling-over device taken on the line IV—IV, Fig. 3.

Fig. 5 is a sectional elevation on the line V—V, Fig. 7, of a table or support for the sectional mold, the latter being illustrated in the open position ready to receive the pulled-over upper indicated in relative position with respect to said mold when the pulling-over device has been inverted over the latter, and the table-carrying clamping means to close the molds.

Fig. 8 is a sectional elevation on the line VIII—VIII, Fig. 7, showing the pulled-over upper clamped in the sectional mold.

Fig. 9 is a cross-sectional view on the line IX—IX, Fig. 8, showing the pulled-over upper clamped to the sectional mold and ready for the application of the wiping members.

Fig. 10 is a similar sectional view showing wiping members in active position over the last and upper.

Fig. 11 is a sectional elevation of the table carrying the sectional mold and its supporting and clamping means; showing one form of side wiping members within the scope of my invention and operating means therefor.

Fig. 12 is a sectional view illustrating one form of heel and toe wiping members within the scope of my invention and operating means therefor, such view being at right angles to the plane of the section illustrated in Fig. 11.

Fig. 15 is a sectional elevation of one form of holding means for the wiped upper which I may employ when the sectional mold is to be removed from its table or support.

Fig. 16 is a plan view of the clamping means shown in Fig. 15, and

Figure 6:
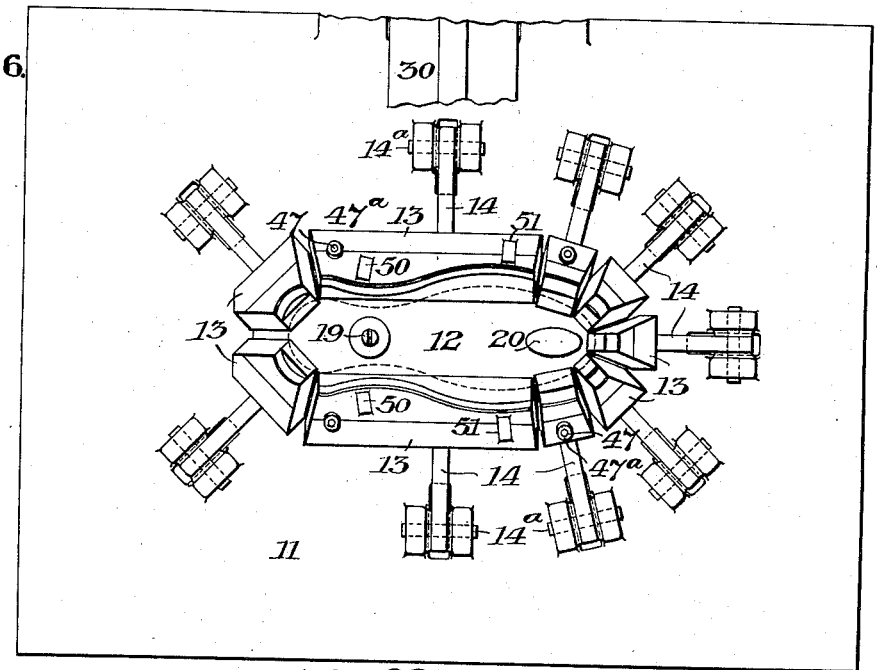
Fig. 6 is a plan view of a sectional mold and mold-clamping means in the open position ready to receive the last and positioned upper.

Figs. 17, 18, 19, and 20 are diagrammatic views of the last and upper illustrating the manner in which the projecting portion of the latter may be wiped and the shoe prepared for the reception of a sole.

An important feature of my invention resides in the operation of lasting the upper without the application of tacks or other securing means designed to hold the upper to the last. A common practice is to effect the pulling-over step in a lasting operation by means which apply a series of tacks to hold the upper to the last. This tacking operation is objectionable for several reasons, among which may be mentioned the necessity of removing the tacks before the outsole is secured to the lasted upper, and the further danger of tacks breaking and leaving projecting portions within the shoe.

For the purpose of pulling over the upper and holding the same in taut condition upon the last, I have provided means in the form of a portable holding device which supports the last and upper after the pulling-over operation preparatory to placing them in a sectional holding mold which confines the upper to the last while the subsequent operations of turning down and holding the projecting portion of the upper, which may be secured to the insole or turned outwardly, preparatory to the application of the outsole, are being carried out. The outsole may be cemented fast to the insole and the turned-over portion of the upper, or such sole may be secured to the upper and/or insole by a sewing operation which may be effected by any of the shoe-sewing machines in well-known use.

In Figs. 1 and 2 of the accompanying drawings, I have shown a structure which may be termed a portable holder with means for pulling over the upper upon the last and holding it preparatory to introduction to the sectional mold, such holding device having nippers which engage the extended portion of the upper with means for keeping such nippers closed until the last and positioned upper have been deposited in such sectional mold and clamped thereby.

This portable holder may comprise a frame 1, having flanges 2 and 2ª, and these flanges carry in relatively semicircular arrangement, which may correspond substantially to the toe counter, a plurality of complemental jaws forming nippers and comprising a series of lower jaws 3, carried by rods 4 passing through the flanges 2 and 2ª, and a series of upper jaws 5, carried by rods 6, which also pass through the flanges 2 and 2ª. In addition, the holder has a table or plate 7 upon which the last and positioned upper are placed, as indicated in Figs. 1, 2, et seq., with the projecting or overhanging portion x of the upper positioned relatively between the respective jaws of the sets of nippers. The last and upper are placed on the table 7 of the frame 1 after the upper has been properly positioned, and then this portable holder is placed relatively to a series of vertically movable plungers 8, which register with the rods 6 carrying the upper jaws 5 of the nippers. The faces of the nipper jaws may have complemental gripping means, or the upper jaws alone may have a series of teeth or projections 5ª over their engaging face and, when the plungers 8 are moved downward into engagement with the rods 6 carrying said upper jaws 5, which operation may be effected by suitable treadle mechanism (not shown), the said jaws 5 engage and pull down the projecting portion x of the upper and clamp the same tightly with the lower jaws 3, continued movement of the plungers 8 lowering the closed jaws with the engaged upper until a satisfactory limit of movement is reached and the upper is stretched tautly over the last. To hold the nippers in this position, the rods 6 carry notched portions 6ª, and spring-pressed latches 9, pivoted at 9ª to the lower flange 2ª of the portable holder, engage these notched portions as the rods 6 are lowered. The rods 4 and 6 may be square, or round, and if round they are preferably provided with keys so that they will be prevented from turning during their movement into and out of clamping position.

The portable holder may be removed from its position beneath the plungers 8 when the upper has been properly stretched over the last. When the latches are released, the rods 4 and 6 may be returned to normal position by the springs 10 and 10ª encircling said rods. These latches may be simultaneously released by means of suitable actuating means,—in the present instance, in the form of a loop 1ª pivotally connected at 1ᵇ to the frame 1. When the portable holder is inverted over the sectional mold, the loop may be placed over the latches and slight pressure thereon will release the same from their engagement with the notched portions 6ª and allow the rods 4 and 6 to move and open the jaws engaging the upper.

Figure 7:
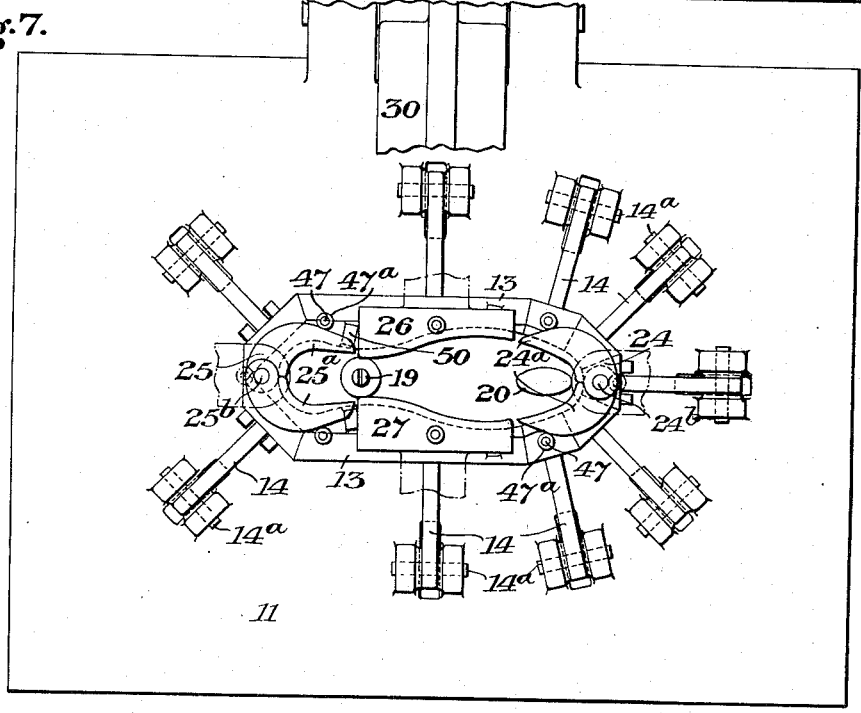
Fig. 7 is a plan view of the sectional mold and the mold-clamping means, showing the pulled-over upper in position within the mold and the wiping members moved to one position they will have in pressing down and holding the extended portion of the upper.

The sectional mold element is shown in Figs. 5, 6, et seq., and may be detachably mounted in or on a table 11, being shown in the present instance as seated in a recess 11ᵃ formed in such table. This mold element may comprise a base member 12, having engaging or gripping portions 13, pivotally connected to such base at 13ᵃ. The upper portions of the gripping members have an internal contour like that of the last and positioned upper to be engaged thereby. In practice I have employed a mold having nine gripping portions or elements; two for the heel portion, one each for the sides, and five for the toe portion of the lasted upper, all as more clearly illustrated in the plan views, Figs. 6 and 7; the former showing the sections of the mold in the open position. In this position it is ready to receive the lasted upper carried by the portable holder, and the operator inverts this holder and presents it to the open sectional mold, the relative position of the last and positioned upper during such presentation being illustrated in Fig. 5 wherein, however, the portable holder has been omitted.

The sectional mold is normally in the closed position, being held in such position by means of levers 14 pivoted at 14ᵃ to the table 11; springs 15 being interposed between the lower ends of such levers and the under side of the table, with adjusting screws 16 carried by the upper portion of a sleeve 17 slidably mounted on the standard 11ᵇ of the table 11. The expansive force of such springs, which are quite heavy, serves to cause the levers 14 to tightly clamp the sections of the mold in the closed position. The adjusting screws 16 serve to take up any irregularity in the length of the levers and insure that the pressure applied by the same to the several sections of the mold will be equalized. To permit the sections of the mold to open, the sleeve 17 is raised, compressing said springs 15 and, at the same time, acting upon the levers and moving them substantially to the position indicated in Fig. 5. When in this position, the mold sections are free to fall back upon said levers in the open position indicated and, if necessary, springs may be carried by the base of the mold to move these sections to the open position. To raise the sleeve 17, I may employ a treadle 18 connected to the lower end of said sleeve and pivotally mounted at 18ᵃ to the base of the table. The mold base may carry a pair of adjustable supports 19 and 20 upon which the last and positioned upper may rest, as clearly indicated in Figs. 5 and 8; support 19 being in the form of a threaded pin which may enter the usual thimble of the last while the support 20 is vertically movable on a stem 20ᵃ to which it may be held by a set screw 20ᵇ. After the last and upper have been introduced into the open mold, the treadle 18 is released and the levers 14 are automatically moved by the springs 15 into engagement with the mold sections, tightly closing the same upon the last and positioned upper. The portable holding device is then released from the latter by displacing the latches 9, and the last and upper are now in position in the mold and ready to have the projecting portion $x$ of such upper laid down and secured to the insole $y$ carried by the last.

This leveling operation may be effected by the use of wiping members for the heel and toe portions of the lasted upper and the sides of the same, and these wiping members may be of the type, for instance, as illustrated at 24, 25, 26, and 27, in Figs. 11, 12, 13, and 14. The wiping members 24 and 25—the former for the toe portion and the latter for the heel portion of the upper—may comprise pairs of jaws 24ᵃ and 25ᵃ, pivotally connected together at 24ᵇ and 25ᵇ, and they may be of usual character. The side wipers 26 and 27 may be arranged to move simultaneously with the heel and toe wiper jaws 24 and 25. These several wiping members serve to smooth down or level the projecting portion $x$ of the upper, and they will be appropriately shaped to properly perform this function.

In Figs. 11 to 14, I have shown means which I may employ for carrying the several wiping members and performing the wiping operation. Hinged to the table 11, preferably at the rear of the same, is an arm 30 which may carry a counterbalance 31, so that, when the wiping means are not in use, they will be out of the way of the other operations. This arm 30 has a hand grasp 30ᵃ so that the wiping means may be brought into proper operative position. The arm 30 carries a shaft 32 which is centrally placed with respect to the sectional mold when in the operative position, and this shaft carries a cam 33, having paths or grooves 34 and 35 adapted for operative engagement with pins 36 and 37 (preferably provided with antifriction rollers 36ᵃ and 37ᵃ) carried by the end wiping members and the side wiping members, respectively.

Figure 13:
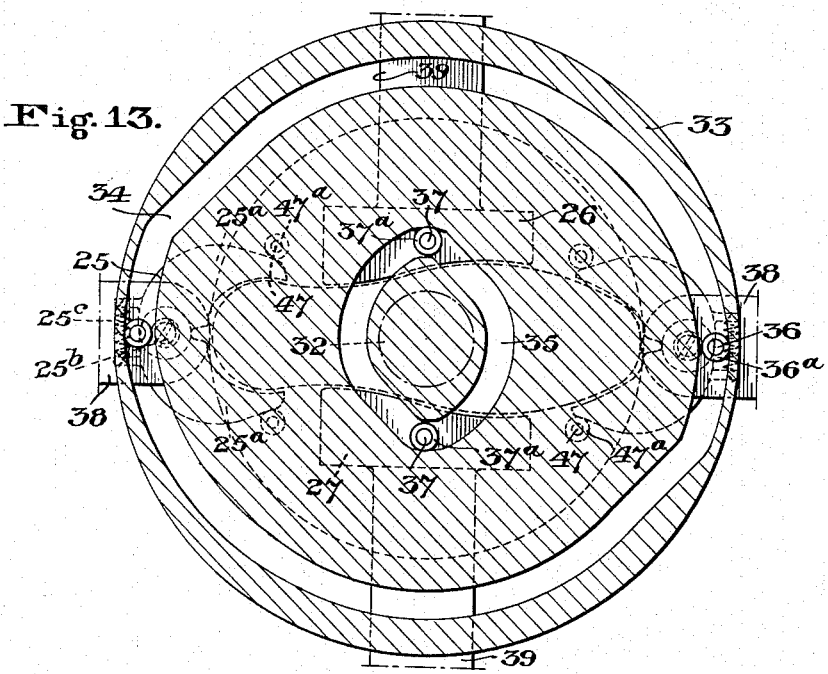
Fig. 13 is a sectional plan view on a slightly larger scale of the cam element employed for operating the wiping means shown in Figs. 11 and 12, the same being illustrated in the inactive position.
Figure 14:
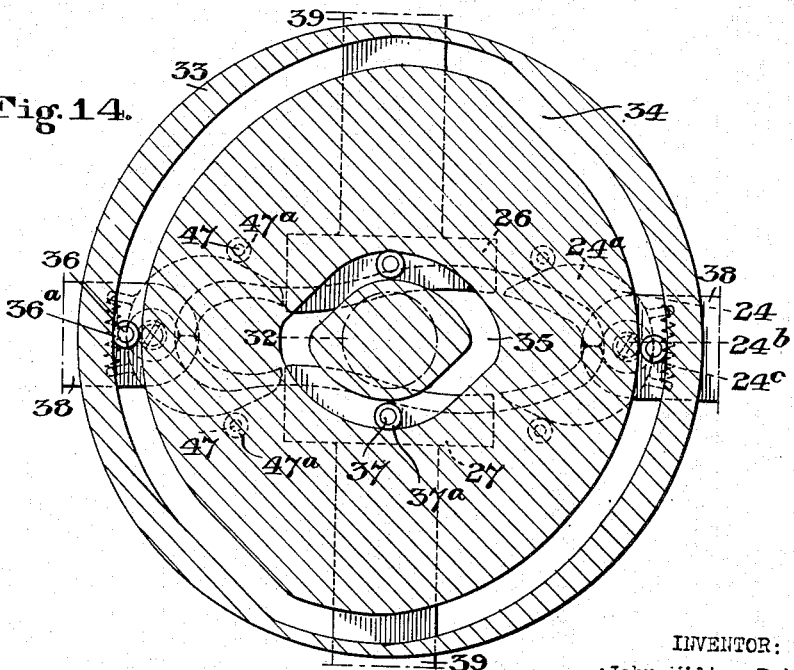
Fig. 14 is a similar view showing the position of the cam when the wipers are brought in-to overlie and press down the projectnig portion of the upper.

In the present arrangement, the several wiping members are carried by stems 38 and 39 slidably mounted in depending brackets 40 and 41 hung from the arm 30 and arranged at right angles to each other; the toe and heel wipers being carried by the stems 38 adapted to the brackets 40 and the side wipers being carried by the stems 39 adapted to the brackets 41. The several wiping members are so positioned that they may be brought down into operative relation with respect to the last and upper and be nominally guided by the top of the sectional mold. To insure engagement and proper contact with the projecting portion $x$ of the upper, I preferably interpose a spring 42 between the cam 33 and the arm 30, which arrangement provides a certain amount of resiliency and permits the wiping members to properly engage the relatively uneven surface of the bottom of the last and the portion $x$ of the upper wiped over the same. The cam may be lowered to bring the wiping members in proper position with respect to the lasted upper supported in the sectional mold when the several wiping members are in the outer or inoperative position, as indicated in Fig. 13, and to insure this condition the edge of the cam may be provided with a suitable index mark, in order that the operator may know the position of the wiping members when the cam is lowered. In the present instance, the cam paths 34 and 35 are so disposed that, when the cam is rotated, the several wiping members will be moved simultaneously to engage the portion $x$ of the upper and smooth or level the same over the insole $y$ carried by the last. It will be understood, of course, that the cam paths or grooves 34 and 35 may be so arranged that the heel and toe wiping members 24 and 25 will be actuated in one direction—inwardly, for instance— while the side wiping members 26 and 27 will be actuated in the opposite direction—outwardly, for instance—and that the several wiping members may be held in a neutral position that will permit the proper positioning of the same with respect to the projecting portion of the upper that is to be wiped thereby when lowered into operative position.

For the purpose of driving the cam 33, I may provide a small motor 43 carried by the arm 30, with appropriate switches under the control of the operator so that such motor may be set in motion after the wiping members have been lowered into proper position with respect to the sectional mold and the lasted upper disposed therein. Preferably, a clutch 44 of suitable character will be interposed between the motor and a bevel pinion 45 on the motor shaft 43a so that the motor may be constantly running and movement of the cam may be controlled by operation of the clutch. The bevel pinion 45 is in driving engagement with a pinion 46 carried by the shaft 32; the latter being keyed to the pinion so as to permit movement of the shaft with respect thereto as the spring may be compressed or expand. In order that thhe pivotally mounted jaws 24a and 25a of the heel and toe wiping elements may be moved toward each other when wiping, I may provide the top of the sectional mold with pins 47, having antifriction rollers 47a which are adapted to contact with the outer portions of said jaws and move them laterally as they are moved longitudinally of the lasted upper by the cam 33, and such jaws may be opened by means of springs 24c and 25c carried by arms projecting from said jaws when these heel and toe wiping members are in their outer positions, as indicated in Fig. 13. The motor may be operated for such length of time as will insure that the projecting portion $x$ of the upper has been leveled or smoothed down and held. It will be understood, of course, that the inner side of this projecting portion $x$ has been coated with a suitable cement before it is wiped so that, when the wipers have performed their function, the portion $x$ will be firmly held in the leveled or smoothed down condition. The arm 30 carrying the several wiping members is held down by the operator so that said members may move in proper relation with respect to the sole portion of the last and properly smooth down the portion $x$ of the upper.

It will be understood, of course, that changes may be necessary in the positioning of the roller pins carried by the several wiping members in order to accommodate their action to shoes of different sizes so that the range of movement may be properly coordinated with respect to the projecting portion of the upper to be leveled. For certain ranges of sizes, one cam and one set of wiping members may be applicable for this operation, when provision is made for relocating the roller pins carried by the respective wiping members to change the range of extent of their movement. When it is necessary to provide wiping means for other sizes or size ranges, other cam plates having cam paths to actuate the wiping members for such other sizes of shoes may be employed, and such cam plates may be set in place in the arm 30 by removing the cam plate in use, such supplemental or substitute cam plates having shafts of a character similar to the shaft 32 to fit the gear pinion 46. In some instances, it may be desirable to employ a cam plate that may be secured to the shaft 32 by a screw so as to make it unnecessary to remove such shaft when changing cam plates. The bracket carriers for the stems of the wiping members may be of such a size or character as to accommodate various sized members having a range of movement for various sized shoes.

It will also be understood that, while I have shown wiping members designed to level the lasted upper by displacing the projecting portion of the upper inwardly over the insole $y$ carried by the last, I may employ wiping members arranged to be placed upon such insole or the bottom of the last within the space defined by the projecting portion of the upper which is upstanding in the position shown in Figs. 18 and 19, and actuate the same to wipe such projecting portion outwardly, so that it may be positioned as a flange with respect to the upper, and upon which a sole may be placed and stitched thereto.

In such instance, I may employ an intermediate layer of material $z$, such as illustrated in Fig. 18, which may extend over the entire insole, or a strip $z'$ which may lie against the inner surface of the projecting portion $x$ of the upper, as shown in Fig. 19, such interposed layer or strip being leveled outwardly by the wiping members together with the portion $x$.

After wiping members of the character illustrated in the drawings have been displaced following a wiping operation by moving the arm 30 to the inactive position, as indicated by dotted lines Fig. 11, the leveled portion of the upper may be rasped by applying a buffing wheel of suitable character to the same so as to prepare such leveled portion for the reception of cement serving to hold an applied outsole in place; which sole may be set in place before the lasted upper is removed from the sectional mold. The mold sections following the contour of the shoe serve as a guide for this rasping operation, and the outer margin of the same will follow the contour of such sections as their point of engagement with the lasted upper. In order that such outsole may be guided in its position with respect to the lasted upper, I may provide certain of the side sections of the mold with guiding means, which may comprise pins 50, pivotally mounted at 50a and adapted, when not in use, to lie in recesses 51 in the upper surface of the mold sections carrying the same. Their upstanding guiding position is indicated by dotted lines in Fig. 9, and also indicated by full lines in Fig. 17.

After an outer sole has been applied to the leveled bottom of the lasted upper within the mold, I apply a holding or clamping device to the mold, and in Figs. 15 and 16, I have shown a structure for this purpose, within the scope of my invention. This device may comprise a carrier 55 having a handle 55a, and supporting a series of rods 56 having plates 57 at their lower ends to engage the outsole applied to the lasted upper. These pressure plates may be pivotally connected.

The rods 56 have springs 56a arranged between the carrier 55 and the sole-engaging plates 57 so that suitable pressure will be applied to the outsole to hold the same in place. In order that this holding or clamping device may be retained with the sectional mold, I provide the same with depending fingers 58, having teeth 58a adapted to engage lugs or teeth 59 carried by certain of the mold sections, and these fingers are preferably bifurcated so as to be applicable to the mold while the sections of the same are being held in closed position by the levers 14, the bifurcated fingers 58 passing down alongside of said levers. These fingers may be carried by pins 60 extending from the plate 55, with springs 60a interposed between the same and heads 60b of said pins. Before this holding or clamping device is applied to the sectional mold, the latter may receive an encircling band or strap 61 serving to hold the mold sections together and retain the lasted upper in proper position with respect to the applied outsole.

When the clamping member is applied to the sectional mold, the latter may be removed from its seat in the table 11, and set to one side until the sole applied to the turned-over and smoothed down portion $x$ of the upper has set, and the shoe is ready for any further operation necessary to secure the sole in place. As soon as one mold is removed from the table 11, another mold may be set in place for the reception of the next last and positioned upper presented by the portable pulling-over device. I employ a series of the sectional molds which may be used successively, the shoes being removed from the same when the outsole is to be sewn or otherwise secured thereto, and a single pulling over device of the portable character indicated in Figs. 1, 2, et seq., may be employed for transferring the last and positioned uppers to the same successively.

It will be understood, of course, that different sized shoes will require different size molds—that is to say, molds having interior contours of different size, since it will be desirable to have all of the sectional molds of the same size externally in order that no changes of size need be made in other parts of the mechanism, and such molds will successively fit the recess 11$^a$ in the table or support 11. The mold sections may have the contour portions 13$^b$ as separate elements or members properly secured thereto, and such contour portions are preferably faced with suitable material to provide a proper seat for the upper positioned on the last. For this purpose, leather facings may be secured to these contour portions, or elastic facings may be employed. These contour members may be of any suitable material properly available for the purpose; metal, hardened fibre, rubber, or other material that will retain its shape and properly grip the upper positioned on a last. These contour portions may be formed by casting suitable material in a proper support, which may be one of the sectional molds, around a finished shoe whose size and shape is to be reproduced, such material being then cut or otherwise separated into sections which are secured to the inner face of the mold sections in proper order. The contour portions may be permanently secured to mold sections, or they may be detachably secured thereto so as to render it possible to shift sets of contour sections with respect to sets of sectional molds when changes in style or size of shoe become necessary. In any event, the contour sections, even when permanently secured to the mold sections, may be displaced or removed to permit the development of other contours when styles change or for other reasons.

It will be understood, of course, that, while I have shown the wiping members as carried by a pivotally mounted arm supported by the table receiving the sectional mold, said wiping members may be supported in a different manner, and that, in lieu of the use of blade elements serving as wiping member, I may employ rollers which may be operated in the same or a similar manner. In like manner, a link motion may be employed for actuating said blades with respect to supporting and guiding means which may be positioned with respect to the last and the upper mounted thereon while disposed within the sectional mold. In like manner, I may employ means for carrying the sectional molds into operative position beneath wiping members which may normally occupy the wiping position ready to have a mold positioned beneath the same.

I have referred to the application of a sole while the lasted upper is retained within the mold. It will be understood, of course, that, after the wiping operation has taken place, the mold with the lasted upper retained by the same may be removed from its support or table and transferred to other means, sole-applying mechanism for instance, which will secure the sole to the lasted upper after the same has been rasped; which sole may be retained in place by cement alone or connected to the upper by a stitching operation.

It will be understood that the lasted upper as finally prepared may be removed from the mold for application of a sole, which maybe sewn thereto by any of the well-known shoe-sewing machines, and soles of different character may be sewn thereto. If the sole is to be cemented to the shoe, such operation may be carried out before the lasted shoe is removed from the mold.

In carrying out my improved method or process, the operator takes a last and places thereon an upper, holding the same in his hand and properly positioning the upper with respect to the center of the last. He pulls the upper forward on the last so that the heel portion of the upper engages the curved heel portion of the last and is substantially flush with the top of the same (in the case of low shoes) and is in proper position with respect to the heel counter (in the case of high shoes) and then places the last with the upper on it on the table of the pulling-over device shown in Figs. 1, 2, et seq. He then actuates the plungers 8 to cause the nippers to engage the overhanging or projecting portion $x$ of the upper and pull the same tautly over the last, such nippers locking so that the device with the lasted upper may be picked up and inverted over the open mold and placed therein and clamped thereto before the pulling-over device is released, after which the several operations described may be carried out while the last and positioned upper are retained in the sectional mold.

It will be understood, of course, that modifications may be made in the mechanism which I have described without departing from my invention, hence the appended claims are intended to cover the mechanism disclosed and such modifications thereof as would be naturally suggested by the employment of such means in carrying out the several steps of the method which I have devised.

No claim is made to the method herein disclosed the same forming the subject of an application filed July 31, 1940, Serial No. 348,625.

I claim:

1. In means for the manufacture of shoes, the combination of a table or support, a sectional mold removably positioned thereon and adapted to receive a last and positioned upper; said mold closing around said last and positioned upper and maintaining the same in a taut condition, pivoted clamping members carried by the table and engaging the sections of the mold, springs normally holding said clamping members in engagement with the mold, a slidable member for simultaneously releasing said clamping members, and means for operating said slidable member.

2. In means for the manufacture of shoes, the combination of a table or support, a sectional mold removably positioned thereon and adapted to receive a last and positioned upper; said mold closing around said last and positioned upper and maintaining such upper in a taut condition, pivoted clamping members carried by the table and engaging the sections of the mold, springs normally holding said clamping members in engagement with the mold, a slidable member for simultaneously releasing said clamping members, and a treadle for operating said slidable member.

3. In the manufacture of shoes, a sectional mold for clamping and holding an upper received therein in pulled-over and lasted condition, comprising a plurality of pivoted members shaped to conform to a shoe at the sole portion of the same, a base to which said members are pivotally connected, supports within said mold upon which the last may rest before the pivoted members of the mold engage the pulled-over and lasted upper, and automatically actuated means for holding said pivoted members in clamping position.

4. In the manufacture of shoes, a sectional mold for clamping and holding an upper received therein in pulled-over and lasted condition, comprising a plurality of members shaped to conform to a shoe at the sole portion of the same, a base carrying said shaped members, pivotal connections between said base and said shaped members, supports within said mold upon which the last may rest before the mold members engage the pulled-over and lasted upper, automatically actuated means for holding said mold members in clamping position, and means for restricting outward movement of the mold members when the means holding them in clamping position has been released.

5. In the manufacture of shoes, a sectional mold for holding an upper in lasted condition, comprising a plurality of members shaped to conform to a shoe at the sole portion of the same, a base carrying said jaws and to which they are pivotally connected, adjustable supports within said base upon which the last may rest before the mold members engage the upper, displaceable means for holding said jaws in clamping position, springs for actuating said displaceable means to clamping position, and means for restricting movement of the mold members when the means holding them in clamping position has been released.

6. A portable sectional mold for the reception of a last and positioned upper received therein in pulled-over and lasted condition, comprising a base member and a plurality of closely fitting elements hinged to said base member; said mold elements being shaped to conform to a shoe at the sole portion of the same and engage the margin of the upper, and automatically actuated means for clamping the mold elements around the last and positioned upper.

7. A sectional mold for the reception of a last and positioned upper received therein in pulled-over and lasted condition, comprising a base member and a plurality of closely fitting elements hinged to said base member; said mold elements being shaped to conform to a shoe at the sole portion of the same and engage the margin of the upper, supports carried by said base upon which the last is initially placed, and automatically actuated means for clamping the mold elements around said lasted upper.

8. A portable sectional mold for the reception of a last and positioned upper in pulled-over and lasted condition, comprising a base member, a plurality of elements hinged to said base member and movable to an open condition; said mold elements being shaped to conform to a shoe at the sole portion thereof and engage the margin of the upper, means for restricting the outward movement of said mold elements, and automatically actuated means for clamping said mold elements around the lasted upper.

9. The combination with a portable mold for clamping and supporting a last and an upper in pulled-over and lasted condition, of a swinging member movable into and out of position over said mold, a plurality of wiping elements carried by said swinging member, and motor driven means for operating said wiping elements.

10. The combination with a mold supporting a last and an upper in pulled-over and lasted condition, of a swinging member movable into and out of position over said mold, a plurality of wiping elements carried by said swinging member, a cam for actuating said wiping elements, and motor driven means for operating said cam.

11. The combination with a mold supporting a last and an upper in pulled-over and lasted condition, of a swinging member movable into and out of position over said mold, a plurality of wiping elements carried by said swinging member including pivotally mounted blades, a cam for operating said wiping elements, and means for rotating said cam.

12. The combination with a mold supporting a last and upper, of a swinging member, a plurality of wiping members carried by said swinging member including pivotally mounted blades; said members being movable into position over the mold, a cam for operating said wiping members, means for rotating said cam, and means for operating said pivotally mounted blades.

13. The combination with a mold supporting a last and upper, of a swinging member, a plurality of wiping members carried by said swinging member including pivotally mounted blades; said members being movable into position over the mold, a cam for operating said wiping members, means for rotating said cam, and means cooperating with the mold for operating said pivotally mounted blades.

14. The combination with a mold supporting a last and upper, means for closing said mold and holding the same in the closed position, a plurality of wiping blades, a support for the same adapted to bring said blades into operative position with respect to the upper disposed in said mold, a cam having a plurality of paths, roller pins carried by said wiping members arranged in said cam paths, a cushioned support for said cam, and motor driven means for rotating said cam.

15. The combination with a sectional mold supporting a last and upper, a plurality of pivotally mounted arms engaging the sections of said mold, springs for holding said arms in the clamping position, means for operating said springs simultaneously to permit release of said clamping arms, and means providing application of an equal pressure by said arms to the several sections of the mold.

16. The combination with a sectional mold supporting a last and upper, a plurality of pivotally mounted arms engaging the sections of said mold, springs for holding said arms in the clamping position, means for operating said springs simultaneously to permit release of said clamping arms, and means for adjusting the relation between said clamping arms and their operating means whereby an equal pressure may be applied to the several sections of the mold.

17. In means for the manufacture of shoes, the combination of a table or support, a sectional mold positioned thereon and adapted to receive a last and positioned upper; said sectional mold being arranged to close around said last and positioned upper and maintaining the same in taut condition, clamping members engaging the sections of the mold, means normally holding said clamping members in engagement with the mold, and means for simultaneously releasing said clamping members.

18. In means for the manufacture of shoes, the combination of a table or support, a sectional mold positioned thereon and adapted to receive a last and positioned upper; said sectional mold being arranged to close around said last and positioned upper and maintaining the same in a taut condition, pivoted clamping members carried by the table and engaging the sections of the mold, springs normally holding said clamping members in engagement with the mold, and means for simultaneously releasing said clamping members.

19. In the manufacture of shoes, a sectional mold for holding an upper in lasted condition comprising a plurality of members shaped to conform to a shoe at or adjacent to the sole portion of the same, a base carrying said mold members and to which they are pivotally connected, displaceable means for holding said mold members in clamping position, springs for actuating said displaceable means to clamping position, means for releasing said mold members, and means for limiting movement of the pivoted mold members when the means holding them in clamping position has been released.

20. In the manufacture of shoes, a sectional mold for holding an upper in lasted condition comprising a plurality of members shaped to conform to a shoe at the sole portion of the same, a base carrying said mold members and to which they are pivotally connected, displaceable clamping levers for holding said mold members in engaging position, springs for actuating said displaceable clamping levers, means for releasing said clamping members, and means for limiting movement of the mold members when the clamping levers have been released.

21. The combination with a sectional mold supporting a last and upper positioned therein, of a plurality of pivotally mounted levers engaging the sections of said mold, springs for holding said levers in the clamping position, means for simultaneously compressing said springs to permit release of said clamping arms comprising a slidable member operatively connected to said levers, means providing application of an equal pressure by said levers to the several sections of the mold, and means for actuating said slidable member.

JOHN MILTON ROHRER.